(12) United States Patent
Schoenek

(10) Patent No.: US 8,425,376 B2
(45) Date of Patent: Apr. 23, 2013

(54) MULTI-SPEED DUAL-CLUTCH TRANSMISSION FOR A HYBRID VEHICLE

(75) Inventor: Norman Schoenek, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 423 days.

(21) Appl. No.: 12/421,887

(22) Filed: Apr. 10, 2009

(65) Prior Publication Data

US 2010/0261575 A1    Oct. 14, 2010

(51) Int. Cl.
B60K 6/36    (2007.10)
B60K 6/38    (2007.10)

(52) U.S. Cl.
USPC ............................................. 477/5; 180/65.22

(58) Field of Classification Search .................. 477/2, 3, 477/5, 6, 7, 8; 180/65.22, 65.25, 65.275; 903/914, 917, 919; 74/330, 331
See application file for complete search history.

(56) References Cited

U.S. PATENT DOCUMENTS

| | | | | | |
|---|---|---|---|---|---|
| 3,623,565 | A | * | 11/1971 | Ward et al. | 180/6.2 |
| 3,798,990 | A | * | 3/1974 | Knappe et al. | 74/411 |
| 3,807,539 | A | * | 4/1974 | Reed | 192/150 |
| 3,894,446 | A | * | 7/1975 | Snoy et al. | 475/88 |
| 4,255,946 | A | * | 3/1981 | Hansen | 464/36 |
| 4,292,557 | A | * | 9/1981 | Kishi | 310/78 |
| 4,662,492 | A | * | 5/1987 | Troeder | 477/177 |
| 5,505,285 | A | * | 4/1996 | Organek | 192/35 |
| 5,833,022 | A | * | 11/1998 | Welke | 180/65.25 |
| 5,875,691 | A | * | 3/1999 | Hata et al. | 74/661 |
| 6,006,149 | A | * | 12/1999 | Salecker et al. | 701/51 |
| 6,341,541 | B1 | * | 1/2002 | Sakamoto et al. | 74/665 A |
| 6,354,974 | B1 | * | 3/2002 | Kozarekar | 475/5 |
| 6,364,042 | B1 | * | 4/2002 | Joachim | 180/65.25 |
| 6,502,474 | B2 | * | 1/2003 | Sakamoto et al. | 74/325 |
| 6,634,247 | B2 | * | 10/2003 | Pels et al. | 74/329 |
| 6,645,105 | B2 | * | 11/2003 | Kima | 475/5 |
| 6,668,994 | B2 | * | 12/2003 | Hirt | 192/48.8 |
| 6,863,140 | B2 | * | 3/2005 | Noreikat et al. | 180/65.23 |
| 7,037,239 | B2 | * | 5/2006 | Werner et al. | 477/176 |
| 7,070,534 | B2 | * | 7/2006 | Pelouch | 475/214 |
| 7,293,637 | B2 | * | 11/2007 | Janson et al. | 192/48.611 |

FOREIGN PATENT DOCUMENTS

CN    1876421 A    12/2006

* cited by examiner

*Primary Examiner* — Frank Vanaman
(74) *Attorney, Agent, or Firm* — Quinn Law Group, PLLC

(57) ABSTRACT

A dynamically-shiftable multi-speed dual-clutch transmission (DCT) for operative connection to an engine and to an electric motor in a hybrid vehicle includes a first clutch, a second clutch, and a third clutch. The first clutch is configured to transmit torque of the engine and withstand energy of the vehicle at launch from rest. The second clutch is configured to select a first set of forward speed ratios. The third clutch is configured to select a second set of forward speed ratios alternating with the speed ratios of the first set. The second and third clutches are each configured to withstand combined torque of the electric motor and torque of the engine during shifts into the respective set of forward speed ratios, but not to withstand torque of the engine at launch or energy of the vehicle at launch.

14 Claims, 3 Drawing Sheets

MULTI-SPEED DUAL-CLUTCH TRANSMISSION FOR A HYBRID VEHICLE

TECHNICAL FIELD

The invention relates to a multi-speed, dual-clutch transmission for a hybrid vehicle.

BACKGROUND OF THE INVENTION

In modern vehicles, multi-speed, dual-clutch transmissions (DCT) are generally utilized for their increased mechanical efficiency in comparison with typical, torque-converter equipped automatic transmissions. Additionally, multi-speed, dual-clutch transmissions are often preferred over typical automated manual transmissions for the DCT's capability to provide higher quality gear shifts.

A typical DCT employs two friction clutches for shifting among its forward ratios, and accomplishes such shifts by alternating engagement between one and the other of the two friction clutches. Such a multi-speed, dual-clutch transmission may be utilized in a hybrid vehicle, i.e. a vehicle employing two or more distinct power sources, such as an engine and an electric motor, for transmitting propulsion energy to subject vehicle's driven wheels. Packaging of the DCT hardware along with the multiple power sources in a hybrid vehicle may, however, pose a challenge.

SUMMARY OF THE INVENTION

A dynamically-shiftable, multi-speed dual-clutch transmission (DCT) for operative connection to an engine and to an electric motor in a hybrid vehicle is provided. As used herein, "dynamic shifting" means that torque is present when a clutch shift to an oncoming speed ratio is made. (Dynamic shifting is accomplished herein via preselection of torque-transmitting mechanisms, i.e. synchronizers, necessarily engaged in the oncoming speed ratio occurring just prior to the exchange of torque between the two input clutches.)

The DCT includes an input member and an output member. Furthermore, the DCT includes a first clutch selectively engageable to couple the engine to the input member, and configured to transmit torque of the engine and withstand energy of the vehicle at launch from rest.

The DCT also includes a second clutch engageable to select a first set of forward speed ratios between the input member and the output member. The second clutch is configured to withstand combined torque of the electric motor and torque of the engine during shifts into the first set of speed ratios but not torque of the engine at launch or energy of the vehicle at launch.

The DCT additionally includes a third clutch engageable to select a second set of forward speed ratios alternating with the speed ratios of the first set between the input member and the output member. The third clutch is configured to withstand combined torque of the electric motor and torque of the engine during shifts into the second set of speed ratios but not torque of the engine at launch or energy of the vehicle at launch.

A case may be employed for the DCT to enclose the input and output members as well as the first, second and third clutches. The electric motor may also be arranged inside the transmission case.

The electric motor may include a rotor, a stator, and a rotor support. The rotor support is employed for supporting the rotor and is configured to provide a first back-plate operable to provide a reaction surface for one of the second and third clutches. The electric motor may additionally provide a static support for supporting the stator.

The DCT may further include a second back-plate engaged with the rotor support operable to provide reaction surfaces for the first clutch and for the other of the second and third clutches.

The DCT may additionally include oil and coolant-feed fittings arranged on the static support, wherein oil is employed to actuate the second and third clutches, and coolant is employed to cool the electric motor. The oil and coolant-feed fittings may operate as locators for the static support with respect to the case.

The DCT may also include a cover plate arranged on the static support to retain the coolant, wherein at least one of the second back-plate and the third back-plate is arranged proximate to the cover plate. Cooling of the back-plate arranged proximate to the cover plate is thus aided by air disk pumping action.

The above features and advantages, and other features and advantages of the present invention are readily apparent from the following detailed description of the best mode for carrying out the invention when taken in connection with the accompanying drawings.

DESCRIPTION OF THE PREFERRED EMBODIMENT

A dynamically-shiftable multi-speed dual-clutch transmission (DCT) may be employed as part of a powertrain for a hybrid vehicle in order to further enhance the vehicle's efficient use of non-renewable sources of energy, such as fossil fuels. Such a DCT may be provided for a P2 "strong hybrid" type of a powertrain, wherein the vehicle is propelled alternatively by an engine, by an electric motor, or a combination of the two.

As utilized herein, the term "dynamically-shiftable" relates to employing a combination of two friction clutches and several dog clutch/synchronizers to achieve "power-on" or dynamic shifts by alternating between engagement of one friction clutch and the other. Generally, the synchronizers are physically "pre-selected" for the oncoming ratio prior to actually making the dynamic shift. As will be readily understood by those skilled in the art, prior to making a "dynamic shift", synchronizers are "pre-selected" to the necessary positions of both the oncoming and off-going ratios prior to actually shifting the torque path from one clutch to the other. The pre-select condition is postponed as much as possible to minimize spin losses because pre-selecting the next ratio forces a speed difference in the open, i.e. not engaged, clutch. This particular gear arrangement allows the combination of torque-transmitting mechanisms for any ratio and its neighboring ratio (i.e., ratio N and ratio N+1) without obtaining a mechanical tie-up in the transmission.

Figure 1:
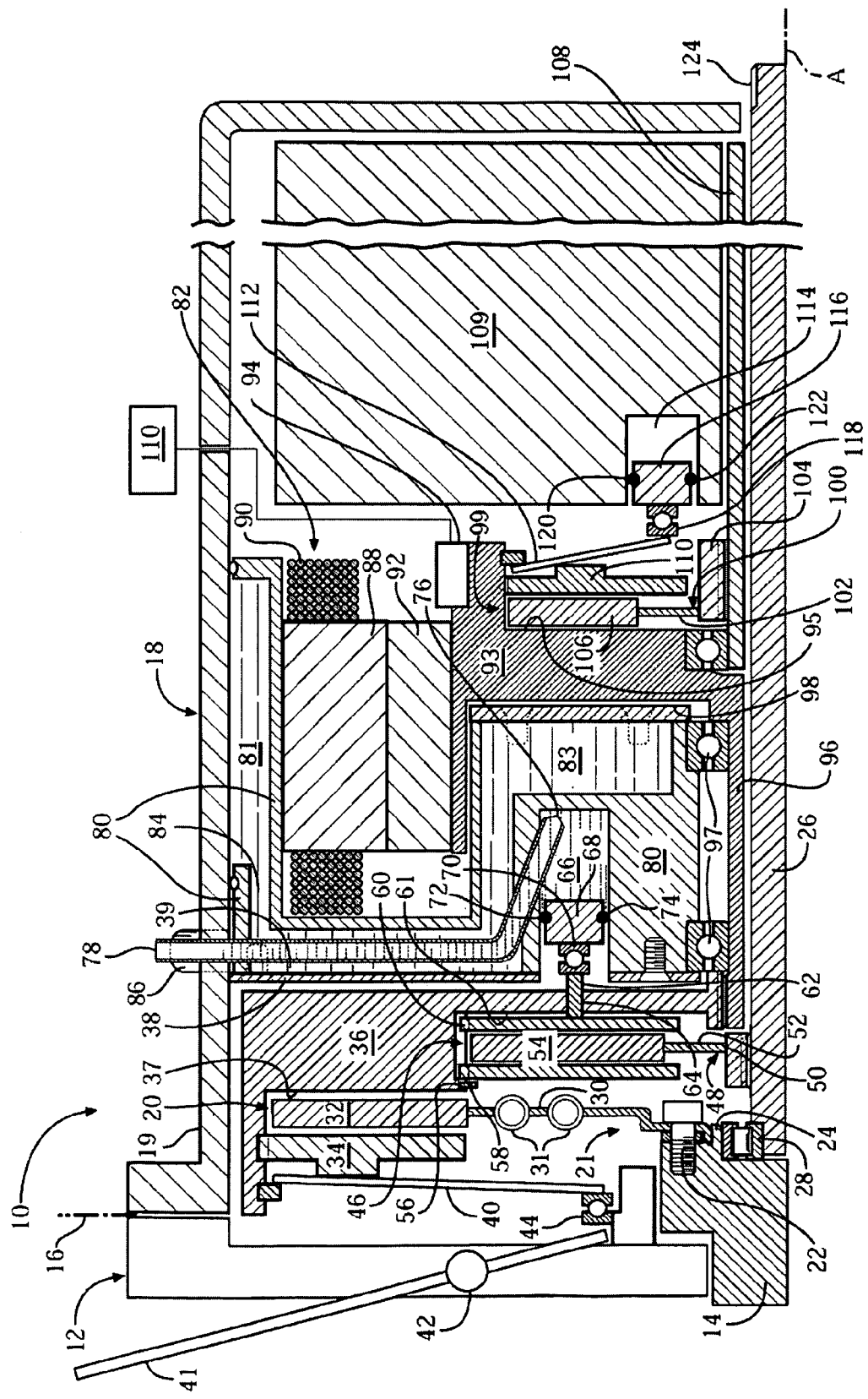
FIG. 1 is a schematic representation of a hybrid powertrain in fragmenting and partial cross-sectional view employing a dynamically-shiftable, dual-clutch transmission in accordance with a first embodiment.

Referring to FIG. 1, a P2 "strong hybrid" powertrain 10 is depicted. For simplicity, the powertrain 10 is shown only above a rotational axis A, however, the powertrain components described below also extend below the axis A, as is understood by those skilled in the art. The hybrid powertrain 10 includes an engine 12, such as, for example, an internal combustion (IC) engine or a fuel cell. Engine 12 utilizes a crankshaft 14 for converting reciprocal motion into rotational motion, as is understood by those skilled in the art. At an engine-transmission interface 16, the engine 12 is joined with a DCT 18 by any appropriate means, including fasteners (not shown) such as threaded screws and dowels. The DCT 18 includes a transmission case 19 for housing elements of the hybrid powertrain 10, as described below.

A first clutch 20 includes a clutch disc 21 joined with the crankshaft 14 by multiple screws 22 at a clutch disc hub 24. The clutch disc 21 is therein driven by the crankshaft 14 at the rotational speed of the engine 12. Clutch disc hub 24 is rotationally joined to a center shaft 26 via a bearing 28, in order to locate the center shaft concentrically with respect to the crankshaft 14. Clutch disc 21 includes a driven plate 30 which is fixed to the hub 24, and a friction lining 32 that is fixed to the driven plate 30. The hub 24 and the friction lining 32 are fixed to the driven plate 30 by any appropriate method, such as riveting or bonding, as understood by those skilled in the art. The driven plate 30 retains damper springs 31 for absorbing engine vibration and torque spikes during vehicle launch.

The first clutch 20 also includes a pressure plate 34 that is positioned generally parallel with respect to a reaction surface 37 of a back-plate 36. The pressure plate 34 is operatively connected to the back-plate 36 for synchronous rotation therewith. The clutch disc 21 is clamped between the pressure plate 34 and the reaction surface 37. Consequently, in operation, due to friction contact with the clutch disc 21, the back-plate 36 functions as a heat sink for the clutch disc 21. The back-plate 36 is positioned in close proximity, parallel to a stationary cover plate 38 to allow disc pumped air to transfer heat to a body of coolant 39 when the back-plate is in motion relative to the cover plate. The provided disc pumped air decreases heat transfer resistance by boundary layer reduction, thereby increasing heat transfer from the back-plate 36, through the cover plate 38 to the body of coolant 39.

The clamping of the clutch disc 21 is affected at the friction lining 32 by a clutch spring 40 acting on the pressure plate 34. A cone-shaped "Belleville" washer is typically employed for the clutch spring 40 due to its favorable spring load versus spring travel characteristics, as understood by those skilled in the art. The clutch spring 40 is externally actuated via a lever 41 acting through a fulcrum 42 and an apply bearing 44. When the lever 41 is thus actuated, and the clutch disc 21 gets clamped, the back-plate 36 is driven synchronously with the crankshaft 14, and torque of the engine 12 is thereby transmitted to the back-plate 36. On the other hand, when the lever 41 is released, the clamping force between the pressure plate 34 and the friction lining 32 is removed, the back-plate 36 is disengaged from the crankshaft 14, and torque flow of the engine 12 is thereby interrupted.

A second clutch 46 includes a clutch disc 48 splined onto the center shaft 26 at a hub 50 for axial movement along rotational axis A. The clutch disc 48 is thereby arranged for synchronous rotation with the center shaft 26. The clutch disc 48 includes a driven plate 52 which is fixed to the hub 50, and a friction lining 54 which is fixed to the driven plate 52 by any of the methods described above with respect to friction lining 32 of disc 21. A snap-ring 56 is installed into the back-plate 36 to prevent a reaction plate 58 from moving in contact with clutch disc 21.

The second clutch 46 also includes a pressure plate 60 positioned generally parallel with respect to the reaction plate 58, and adjacent surface 61 of the back-plate 36. The reaction plate 58 and the pressure plate 60 are operatively connected to the back-plate 36 for synchronous rotation therewith. An actuating member 62 passes through an aperture 64 in the back-plate 36 for forcing pressure plate 60 into contact with clutch disc 48 to thereby clamp the clutch disc 48 between the reaction plate 58 and the pressure plate 60. As a result of friction contact with the clutch disc 48, the reaction plate 58, the pressure plate 60, and back-plate 36 function as a heat sink for the clutch disc 48. When the second clutch 46 is thereby engaged by clamping the disc 48 in combination with an engaged first clutch 20, the center shaft 26 transmits torque from the engine 12 to drive the vehicle.

During engagement of the second clutch 46, the actuating member 62 is urged toward the pressure plate 60 by the action of pressurized oil within a cavity 66 translating a piston 68 via an apply bearing 70. The piston 68 includes seal rings 72 and 74 to seal the pressurized oil from accessing clutch disc 48. Oil is delivered into the cavity 66 via a localized oil passage 76 in fluid communication with an oil-feed fitting 78. Oil is delivered into to the oil-feed fitting 78 by an oil pressure source such as an oil pump (not shown).

Figure 2:
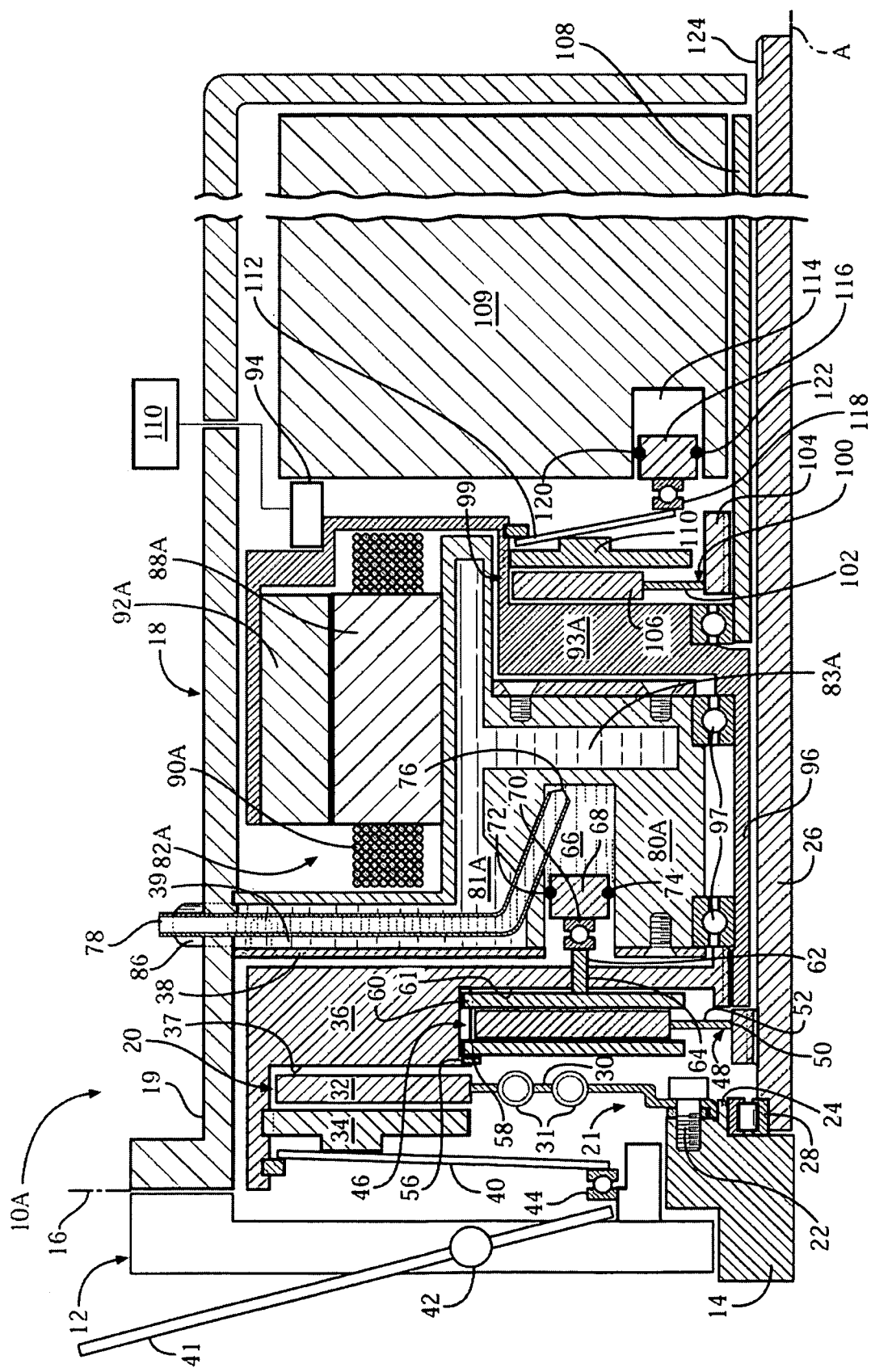
FIG. 2 is a schematic representation of a hybrid powertrain in fragmenting and partial cross-sectional view employing a dynamically-shiftable, dual-clutch transmission in accordance with a second embodiment.
Figure 3:
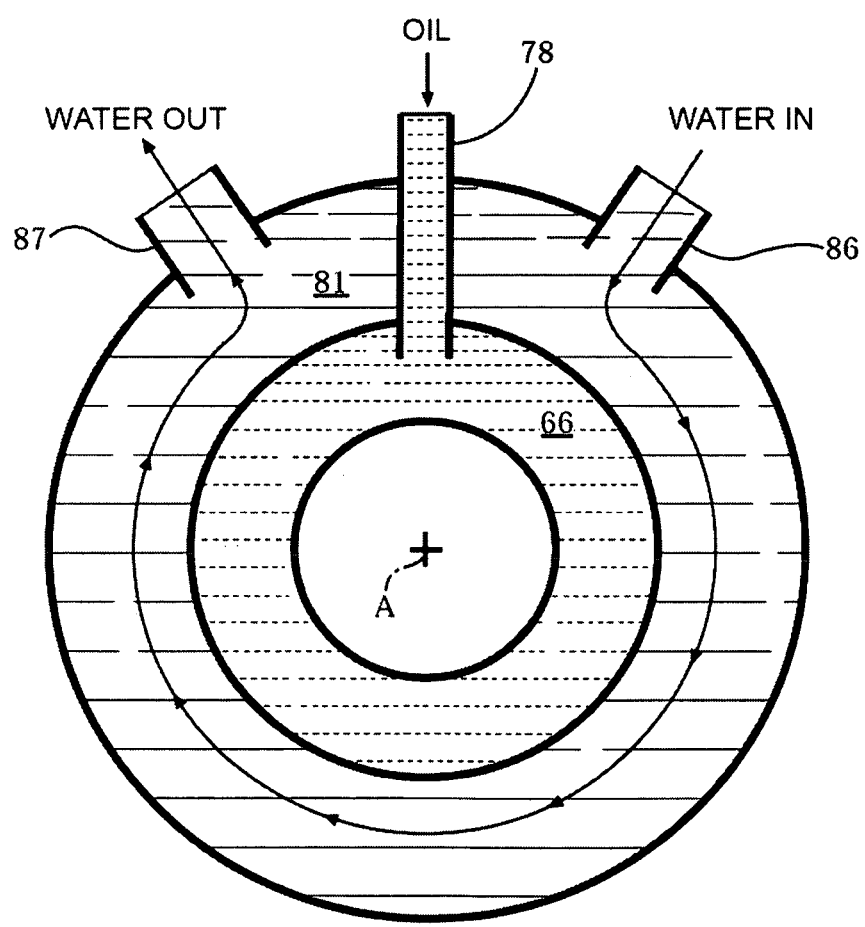
FIG. 3 is a schematic cross-sectional front view of the dynamically-shiftable, dual-clutch transmission shown in FIGS. 1 and 2, depicting orientation of oil-feed, coolant-feed and coolant out fittings.

Oil passage 76 and oil-feed fitting 78 are incorporated into a static support 80 of an electric motor 82. Also incorporated into the static support 80 are a coolant passage 84, a coolant-feed, i.e. coolant-in, fitting 86, as shown in FIGS. 1, 2 and 3, and coolant-out fitting 87, as shown in FIG. 3. FIG. 3 shows the coolant-out fitting 87 being spaced angularly away from the coolant-feed fitting 86 in order to maximize the radial coverage of coolant jacket areas 81 and 83 for more effective cooling of regions with high heat concentration inside DCT 18. Coolant jacket areas 81 and 83 are in fluid communication with the coolant body 39.

As shown in FIG. 3, the oil-feed fitting 78 is positioned radially between the coolant-out fitting 87 and the coolant-feed fitting 86 in order to achieve a more efficient packaging of the oil and coolant passages. In FIG. 3, arrows depict direction of oil and coolant flow. The oil delivered to the oil passage 76 is a highly refined mineral-based fluid typically optimized for friction and gear lubrication requirements of transmissions. The contemplated coolant delivered to the coolant passage 84 is a typical solution of a suitable organic chemical (most often ethylene glycol, diethylene glycol, or propylene glycol) in water.

The oil-feed fitting 78 and the coolant-feed fittings 86 and 87 may be threaded for ease of assembly with the static support 80, and may protrude through the case 19 for connection to external oil and coolant supply sources (not shown). The oil-feed fitting 78 and the coolant-feed fittings 86 and 87 are installed after the electric motor 82 is assembled inside the case 19. Thus installed, the oil-feed fitting 78 and the coolant-feed fittings 86 and 87 engage the case 19 via dedicated apertures (not shown) in the case, operating as physical locators and retention for the static support 80 inside the DCT 18 with respect to the transmission case 19.

Secured to the static support 80 is the cover plate 38 for retaining the body of coolant 39 adjacent to the static support. Thus secured, cover plate 38 is positioned in close proximity, parallel to the back-plate 36 thus providing the disc pumping of air and increased heat transfer to the coolant body 39, as described above. Static support 80 is configured to retain a stator subassembly of an iron (steel) core 88 and a wire coil, i.e. winding, 90 of the electric motor 82. A rotor 92 is positioned within the iron core 88. The rotor 92 is spun by a magnetic field generated when electric current is passed through the winding 90, as understood by those skilled in the art. The rotor 92 is affixed to a rotor support 93. The rotor support 93 houses a resolver 94, which is an electronic device configured to sense rotating position of the rotor 92. The rotor support 93 includes a sleeve shaft portion 96. The sleeve shaft portion 96 is supported on the static support 80 via bearings 97. The center shaft 26 extends axially within the sleeve shaft portion 96. The back-plate 36 is splined to the shaft portion 96 of the rotor support 93 for axial movement on the shaft portion along the rotational axis A. The rotor support 93 also includes a reaction surface 95 for a third clutch 99.

The third clutch 99 includes a clutch disc 100. The clutch disc 100 includes a driven plate 102 which is fixed to the hub 104, and a friction lining 106 which is fixed to the driven plate 102 by any of the methods described above with respect to friction lining 32 of disc 21. The clutch disc 100 is splined onto an outer shaft 108 at the hub 104 for axial movement along rotational axis A. The clutch disc 100 is thereby arranged for synchronous rotation with the outer shaft 108. When the third clutch 99 is engaged by clamping the disc 100, the outer shaft 108 transmits torque from the engine 12 and/or electric motor 82 to gear set 109 of the transmission. As shown, the third clutch 99, as well as the first clutch 20 and the second clutch 46, are dry-type friction clutches. However, these clutches may also be configured as wet friction-type, where the friction material is immersed in a specially formulated mineral oil, as is commonly done in automatic transmission applications, and understood by those skilled in the art.

Electric motors tend to generate high heat during operation. As shown, the electric motor 82 is a permanent magnet-type, which typically has a relatively high torque density, i.e. output potential, but tends to demagnetize, i.e. lose its function, at temperatures exceeding approximately 150 degrees Celsius. As presented, the powertrain 10 is configured to accept an induction-type of an electric motor 82, which typically would not be incapacitated by same levels of heat as the permanent-magnet type may be. Additionally, weighing in the choice of selecting between the two types of electric motors is the fact that induction-type electric motors are typically less costly, but have a lower torque density than permanent-magnet type electric motors.

To deal with the elevated temperatures inherent to operation of electric motor 82, and prevent possible demagnetization if a permanent-magnet type electric motor is employed, the aforementioned coolant passage 84 is provided. The coolant passage 84 is configured as a network of localized fluid channels connecting coolant jacket areas positioned to dissipate concentrations of thermal energy near sensitive components of the electric motor 82, and remove heat from clutches 20, 46 and 99. The cross-section of the hybrid powertrain 10, as shown in FIG. 1, is taken at the localized channels of the fluid coolant passage 84 to more clearly depict fluid communication between the coolant jacket area 81 and the coolant jacket area 83. As such, the coolant passage 84 delivers coolant to coolant jacket area 81 within the static support 80 for removing heat generated in the winding 90 and conducted into the iron core 88 during operation of the electric motor 82. The coolant passage 84 additionally delivers coolant to coolant jacket area 83 within the static support 80 for removing heat absorbed by the rotor support 93 during application of the third clutch 99. The coolant jacket area 83 is sealed off from the electric motor 82 by a cover plate 98. Cover plate 98 is secured to the static support 80, and removes clutch heat in a fashion similar to that described with respect to cover plate 38.

The third clutch 99 additionally includes a pressure plate 110 positioned generally parallel with respect to a reaction surface 95 of the rotor support 93. The pressure plate 110 is operatively connected to the rotor support 93 for synchronous rotation therewith. The clutch disc 100 is clamped at the friction lining 106 between the pressure plate 108 and the reaction surface 95 by the clamping action of a clutch spring 112, which may be a "Belleville" washer, as described above with respect to the clutch spring 40. Consequently, due to friction contact with the clutch disc 100, the rotor support 93 additionally functions as a heat sink for the clutch disc 100. With the friction lining 106 thus clamped, the outer shaft 108 is thereby driven synchronously with the rotor support 93 at rotational speed of electric motor 82. The clutch spring 112 is actuated by the action of pressurized oil within a cavity 114. The pressurized oil is delivered to the cavity 114 by a dedicated oil passage (not shown) in the gear set 109 for translating a piston 116 via an apply bearing 118. The piston 116 includes seal rings 120 and 122 to seal the pressurized oil from accessing clutch disc 100. Oil is delivered into the cavity 114 via an oil pressure source such as an oil pump (not shown).

The transmission 18 is operated to select speed ratios between an input member, which, depending on the speed ratio required, may be one of the center shaft 26, the rotor support 93, the outer shaft 108, or a combination of the above, and an output member, i.e. an output shaft 124 of the transmission. As employed in automotive manual transmissions and will be known to those skilled in the art, a transmission gear set 109 (not shown) includes gears, each having a specific number of teeth. Therefore, by selectively meshing, i.e. interconnecting, specific adjacent gears with a dissimilar number of teeth, an appropriate speed (and torque) ratio may be selected. As additionally used in automotive manual transmissions, the transmission 18 includes dog-clutch synchronizers (not shown) for synchronizing speeds of adjacent gears upon engagement.

As shown, the first clutch 20 is a launch clutch, i.e. a clutch capable of being engaged to transmit direct torque of the engine 12 and withstand energy of the vehicle during such a launch, and being disengaged to cease such torque transmission. The second clutch 46 is shown as a clutch engageable to select odd-numbered, or a first set of forward speed ratios between one or more input members, including center shaft 26, rotor support 93, and outer shaft 108, and output member, shaft 124, of the transmission. The third clutch 99 is shown as a clutch engageable to select even-numbered, or a second set of forward speed ratios between the one or more input members, including center shaft 26, rotor support 93, and outer shaft 108, and shaft 124. It should be noted that, as configured, all three clutches, first clutch 20, second clutch 46 and third clutch 99, are normally disengaged. Therefore, these clutches are incapable of transmitting significant torque unless a suitable amount of force is applied via apply bearings 44, 70 and 118, for their respective engagement.

Clutches 46 and 99 operate solely as disconnect and shifting clutches, i.e. engaged/disengaged to affect speed ratio changes between odd-numbered and even-numbered ratios. Additionally, clutches 46 and 99 are configured to withstand input energy during such shifts, but not to withstand direct torque of the engine 12, or energy of the vehicle at launch from rest. The second clutch 46 and the third clutch 99 are specifically configured to slip under input torque exceeding torque calculated necessary to be transmitted in their respective speed ratios. Ability of the clutches 46 and 99 to slip under excessive powertrain torque provides a "fuse" function preventing gear set 109 from being overloaded, and prevents such disturbances from reaching the vehicle passenger compartment.

FIG. 2 shows a powertrain 10A according to an alternative embodiment. All elements in FIG. 2 are same as identically numbered elements in FIG. 1. Powertrain 10A is generally configured same as powertrain 10 shown in FIG. 1, except for an electric motor 82A in place of the electric motor 82. Electric motor 82A is configured with iron core 88A positioned within rotor 92A. Static support 80A is configured to retain a stator subassembly of an iron core 88A and a winding 90A. The rotor 92A is affixed to a rotor support 93A. The rotor support 93A includes a sleeve shaft portion 96. The sleeve shaft portion 96 is supported on the static support 80A via bearings 97. Such configuration permits the coolant jacket 81A to be positioned inside the electric motor 82A, thereby freeing up space for a larger diameter and higher torque output electric motor, or permit retaining same torque output in a larger diameter, but shorter electric motor.

For illustration purposes, powertrain operation will be described with respect to the elements of powertrain 10 shown in FIG. 1, the operation of powertrain 10A shown in FIG. 2, however, is identical. In operation, the transmission 18 is capable of transmitting torque from either one or more of the input members, including the center shaft 26, the rotor support 93, and the outer shaft 108, to generate multiple forward speed ratios (and at least one reverse speed ratio) to the output shaft 124. Furthermore, at forward speeds the transmission of torque from the input members to the output shaft 124 is accomplished by dynamic shifting between the clutches 46 and 99. When the third clutch 99 is engaged and the clutch disc 46 is disengaged, the outer shaft 108 transmits torque of the hybrid powetrain 10 to gear set 109, thereby allowing an appropriate shift to achieve the selection of any even-numbered forward speed ratio. When the second clutch 46 is engaged and the clutch disc 100 is disengaged, the center shaft 26 transmits torque of the hybrid powetrain 10 to gear set 109, thereby allowing an appropriate shift to achieve the selection of any odd-numbered forward speed ratio.

Although in the embodiment the center shaft 26 is described as providing a torque path to odd-numbered speed ratios, and the outer shaft 108 is described as providing a torque path to even-numbered speed ratios, a converse configuration may be provided. With the essence of the apparatus remaining unchanged, as is understood by those skilled in the art, the gear set 109 may be configured so that the center shaft 26 provides a torque path to even-numbered speed ratios, while the outer shaft 108 provides a torque path to odd-numbered speed ratios.

Exemplifying operation of the powertrain 10, when the subject vehicle is being driven solely on electrical power via the electric motor 82, engine 12 is off, second clutch 46 is engaged, and first clutch 20 is disengaged. Electric motor 82 drives shaft 96. Because electric motors typically have infinite torque at low rotating speeds, clutch slippage at start-up, i.e. friction launch, is not required when driving solely via the electric motor 82. Therefore, driving a vehicle utilizing only the electric motor 82 in a first speed ratio is obtained via a disengaged third clutch 99, and a fully engaged, i.e. non-slipping, second clutch 46 transmitting electric motor torque to shaft 26. In preparation for making a dynamic shift into second speed ratio, in the gear set 109, appropriate synchronizers are then pre-selected. To obtain second speed ratio, third clutch 99 is engaged while simultaneously disengaging second clutch 46.

If power of an on-board electric storage device (not shown), such as one or more batteries, runs down while the vehicle is in a higher ratio, such as second speed ratio or above, engine 12 is started to provide propulsion assist. In order to start engine 12, torque of the electric motor 82 is commanded to increase while first clutch 20 is simultaneously engaged via the lever 41. The engagement of first clutch 20 transmits torque of the electric motor 82 to turn over the engine 12. As a result, the engine 12 fires and, depending on the engaged speed ratio, correspondingly speeds up to match road speed of the vehicle, in what is called a "flying start". With engine 12 started and propelling the vehicle, electric motor 82 may be driven by the engine as a motor-generator to recharge the electric storage device, or the electric motor may be employed to supplement engine torque.

When the subject vehicle is being driven solely via engine 12, electric motor 82 is off, first clutch 20 is engaged, second clutch 46 is employed to engage odd-numbered speed ratios and third clutch 99 is employed to engage even-numbered speed ratios. Because engine 12 has torque characteristics largely dependent on engine speed, a friction launch, especially at vehicle start-up, is typically required to overcome vehicle inertia. Therefore, a vehicle start-up launch utilizing only the engine 12 in a first speed ratio is obtained via a fully engaged second clutch 46, a disengaged third clutch 99, and a modulated, slipping first clutch 20 transmitting engine torque to shaft 26, while clutch 46 acts as a fuse. A shift from first to second speed ratio is accomplished as described above for the vehicle being driven solely with the electric motor 82. In order to drive the subject vehicle by a combination of engine 12 and electric motor 82, while the first clutch 20 is engaged, the electric storage device powers up the electric motor for transmitting electric motor torque to the back-plate 36.

While the best mode for carrying out the invention has been described in detail, those familiar with the art to which this invention relates will recognize various alternative designs and embodiments for practicing the invention within the scope of the appended claims.

The invention claimed is:

1. A dynamically-shiftable multi-speed dual-clutch transmission for operative connection to an engine in a hybrid vehicle comprising:
    an input member;
    an output member;
    an electric motor;
    a first clutch selectively engageable to couple the engine to the input member, and configured to transmit torque of the engine at launch and withstand energy of the vehicle at launch from rest by modulated slippage;
    a second clutch engageable to select a first set of forward speed ratios between the input member and the output member, and configured to withstand, by modulated slippage, combined torque of the electric motor and torque of the engine during shifts into the first set of speed ratios but not torque of the engine that exceeds torque required to be transmitted in the first set of speed ratios such that the second clutch acts as a fuse;
    a third clutch engageable to select a second set of forward speed ratios alternating with the speed ratios of the first set between the input member and the output member, and configured to withstand, by modulated slippage, combined torque of the electric motor and torque of the engine during shifts into the second set of speed ratios but not torque of the engine that exceeds torque required to be transmitted in the second set of speed ratios such that the third clutch acts as a fuse; and a transmission case arranged to enclose the input and output members and the first, second and third clutches;

wherein the electric motor is arranged inside the transmission case, and comprises a rotor, a stator, a rotor support for supporting the rotor and configured to provide a first back-plate operable to provide a reaction surface for one of the second and third clutch, and a static support for supporting the stator.

2. The dual-clutch transmission of claim 1, wherein the electric motor is a permanent-magnet type.

3. The dual-clutch transmission of claim 1, wherein the electric motor is an induction type.

4. The dual-clutch transmission of claim 1, further comprising a second back-plate engaged with the rotor support operable to provide reaction surfaces for the first clutch and for the other of the second and third clutches.

5. The dual-clutch transmission of claim 4, further comprising a cover plate arranged on the static support to retain the coolant, wherein at least one of the second back-plate and the third back-plate is arranged proximate to the cover plate to provide air disk pumping action to aid cooling of the back-plate arranged proximate to the cover plate.

6. The dual-clutch transmission of claim 1, further comprising oil-feed, coolant-feed and coolant-out fittings arranged on the static support, wherein oil is employed to actuate the second and third clutches, and coolant is employed to cool the electric motor.

7. The dual-clutch transmission of claim 6, wherein the oil and coolant fittings operate as locators for the static support with respect to the case.

8. A hybrid vehicle comprising:
an engine operable to propel the vehicle; and
a dynamically-shiftable multi-speed dual-clutch transmission operatively connected to the engine; the transmission including:
an input member;
an output member;
an electric motor operable to propel the vehicle;
a first clutch selectively engageable to couple the engine to the input member, and configured to transmit torque of the engine at launch and withstand energy of the vehicle at launch from rest by modulated slippage;
a second clutch engageable to select a first set of forward speed ratios between the input member and the output member, and configured to withstand, by modulated slippage, combined torque of the electric motor and torque of the engine during shifts into the first set of speed ratios but not torque of the engine that exceeds torque required to be transmitted in the first set of speed ratios such that the second clutch acts as a fuse;
a third clutch engageable to select a second set of forward speed ratios alternating with the speed ratios of the first set between the input member and the output member, and configured to withstand, by modulated slippage, combined torque of the electric motor and torque of the engine during shifts into the second set of speed ratios but not torque of the engine that exceeds torque required to be transmitted in the first set of speed ratios such that the third clutch acts as a fuse; and
a transmission case arranged to enclose the input and output members and the first, second and third clutches;
wherein the electric motor is arranged inside the transmission case, and comprises a rotor, a stator, a rotor support for supporting the rotor and configured to provide a first back-plate operable to provide a reaction surface for one of the second and third clutch, and a static support for supporting the stator.

9. The hybrid vehicle of claim 8, wherein the electric motor is is a permanent magnet-type.

10. The hybrid vehicle of claim 8, wherein the electric motor is an induction-type.

11. The hybrid vehicle of claim 8, further comprising a second back-plate engaged with the rotor support operable to provide reaction surfaces for the first clutch and for the other of the second and third clutches.

12. The hybrid vehicle of claim 11, further comprising a cover plate arranged on the static support to retain the coolant, wherein at least one of the second back-plate and the third back-plate is arranged proximate to the cover plate to provide air disk pumping action to aid cooling of the back-plate arranged proximate to the cover plate.

13. The hybrid vehicle of claim 8, further comprising oil-feed, coolant-feed and coolant-out fittings arranged on the static support, wherein oil is employed to actuate the second and third clutches, and coolant is employed to cool the electric motor.

14. The hybrid vehicle of claim 13, wherein the oil and coolant fittings operate as locators for the static support with respect to the case.

\* \* \* \* \*